United States Patent [19]
White

[11] Patent Number: 5,205,886
[45] Date of Patent: Apr. 27, 1993

[54] METHOD OF LINING METALLIC PIPE USING CONCENTRIC TUBES OF THERMOPLASTIC POLYMER AND TEAR RESISTANT MATERIAL

[75] Inventor: George White, Glenburnie, Canada

[73] Assignee: Du Pont Canada Inc., Mississauga, Canada

[21] Appl. No.: 898,167

[22] Filed: Jun. 12, 1992

Related U.S. Application Data

[63] Continuation of Ser. No. 692,160, Apr. 26, 1991, abandoned.

[30] Foreign Application Priority Data

May 2, 1990 [GB] United Kingdom ............ 90 09900

[51] Int. Cl.$^5$ ........................... E04B 2/00; B05D 7/22
[52] U.S. Cl. ................................ 156/71; 156/143;
156/144; 156/287; 156/294; 427/238; 427/239;
427/384; 138/145
[58] Field of Search ............... 156/71, 143, 144, 287,
156/294, 384; 427/238, 239, 372.2; 138/145

[56] References Cited

U.S. PATENT DOCUMENTS

| | | | |
|---|---|---|---|
| 2,724,672 | 11/1955 | Rubin | 154/82 |
| 2,881,093 | 4/1959 | Buell | 427/239 |
| 3,307,996 | 3/1967 | Keneipp Jr. | 427/239 |
| 3,560,295 | 2/1971 | Kimbrell | 156/287 |
| 4,681,783 | 12/1985 | Hyoda et al. | 428/36 |
| 4,687,677 | 8/1987 | Jonasson | 427/54.1 |
| 4,865,673 | 9/1989 | Shishkin et al. | 156/294 |

FOREIGN PATENT DOCUMENTS

| | | |
|---|---|---|
| 531102 | 10/1956 | Canada . |
| 1241262 | 8/1988 | Canada . |
| 0275060 | 7/1988 | European Pat. Off. . |
| 2018384 | 10/1979 | United Kingdom . |

Primary Examiner—Michael Lusigan
Assistant Examiner—Benjamin L. Utech

[57] ABSTRACT

An improved method of inserting a liner into a metallic pipeline is disclosed. The liner is formed from a plurality of concentric tubes that are enveloped in a flexible, expansible, tear resistant material. When the concentric tubes are pulled into the pipeline, the tear resistant material provides protection against tearing of the tubes by burrs, snags or other imperfections on the inside of the metallic pipeline. The tear resistant material may be a fabric, woven material or mesh. Materials having a structure that permits escape of fluid entrapped during subsequent expansion of the concentric tubes on formation of the liner are preferred. The method permits the lining of pipeline sections that have bends, loops or the like, while protecting the liner from tearing during insertion into the pipeline.

7 Claims, 2 Drawing Sheets

METHOD OF LINING METALLIC PIPE USING CONCENTRIC TUBES OF THERMOPLASTIC POLYMER AND TEAR RESISTANT MATERIAL

This is a continuation of application Ser. No. 07/692,160 filed Apr. 26, 1991, now abandoned.

The present invention relates to a method for the lining of metallic pipe with a thermoplastic polymer using a plurality of concentric flexible tubes formed from a thermoplastic polymer in which the tubes are enveloped in a flexible, tear resistant material and pulled through a length of metallic pipe and then inflated to form the lining in the pipe.

Metallic pipe, especially steel pipe, is used in the transportation of fluids. A primary example is the use of steel pipelines for the transportation of petroleum products, including crude oil and petroleum gases. Crude oil may contain brine, and in some instances contains 70-90% by weight of brine. Such pipelines may be used to transport fluids over long distances through harsh terrain e.g. the transportation of petroleum products from the Arctic. Pipelines are susceptible to corrosion, for example as a result of moisture and acidic materials in the petroleum products, which can severely limit the useful life of a pipeline.

Pipelines may be protected by lining the metallic pipe with a thermoplastic polymer, and use of a variety of polymers is known in the art. Canadian 531 102 of J.M. Reilly, issued 1956 Oct. 02, relates to the lining of rigid pipe with an elastic thermoplastic material. U.S. Pat. No. 2,724,672 of L.C. Rubin, which issued 1955 Nov. 22, describes the lining of metal pipe with fluorocarbon polymers. The lining of metal pipe with polyvinylchloride is described in U.S. Pat. No. 3 560 295 of W.B. Kimbrell et al., which issued 1971 Feb. 02. The lining of pipe with, in particular, polyethylene is described in Canadian 1 241 262 of A.D. Whyman and D.A. Kneller, which issued 1988 Aug. 30.

The lining of metallic pipe using a plurality of concentric flexible tubes is disclosed in the copending patent Application of G. White filed Apr. 26, 1991 and bearing Ser. No. 07/692,159 concurrently herewith Oct. 7, 1992, currently pending.

Metallic pipe tends to have imperfections on the interior surface. Such imperfections may result from burrs formed during cutting of the pipe, welds formed in the pipe that are not smooth on the interior surface and other imperfections formed during the manufacture of the pipe. The pulling or other insertion of a plurality of concentric flexible tubes through such a pipe may result in one i.e. the outer, or more of the tubes becoming snagged or otherwise caught on such imperfections with the result that the tubes will be torn and the effectiveness of the tubes or liners formed therefrom in protecting the pipe might be compromised.

SUMMARY OF THE INVENTION

It has now been found that metallic pipe may be lined using a plurality of concentric flexible tube formed from thermoplastic polymer, in which the tubes are enveloped in a flexible, tear-resistant material.

Accordingly, the present invention provides a method of lining a metallic pipe comprising:
(a) forming a plurality of concentric flexible tubes of thermoplastic polymer enveloped with a layer of a flexible, expansible, tear resistant material, said tubes being capable of being bonded together under the influence of heat and pressure;
(b) inserting the enveloped plurality of concentric tubes into a section of metallic pipe;
(c) inflating the tubes using a fluid under pressure; and
(d) heating the tubes within the pipe to cause the tubes to be bonded together to form a single tube lining said metallic pipe.

In a preferred embodiment of the method of the present invention, the concentric tubes are coated with an adhesive that is activated under the influence of heat.

In a further embodiment, the tear resistant material is a woven thermoplastic polymer structure or a wire mesh.

In another embodiment, the tear resistant material is a woven fabric formed from tapes of a thermoplastic polymer, especially a polyolefin.

In yet another embodiment, the tear resistant material is a fabric formed from fibres of a thermoplastic polymer, especially a polyolefin or a polyamide.

BRIEF DESCRIPTION OF THE DRAWINGS

The present invention will be particularly described with reference to the embodiments shown in the drawings in which.

DETAILED DESCRIPTION OF THE INVENTION

Figure 1:
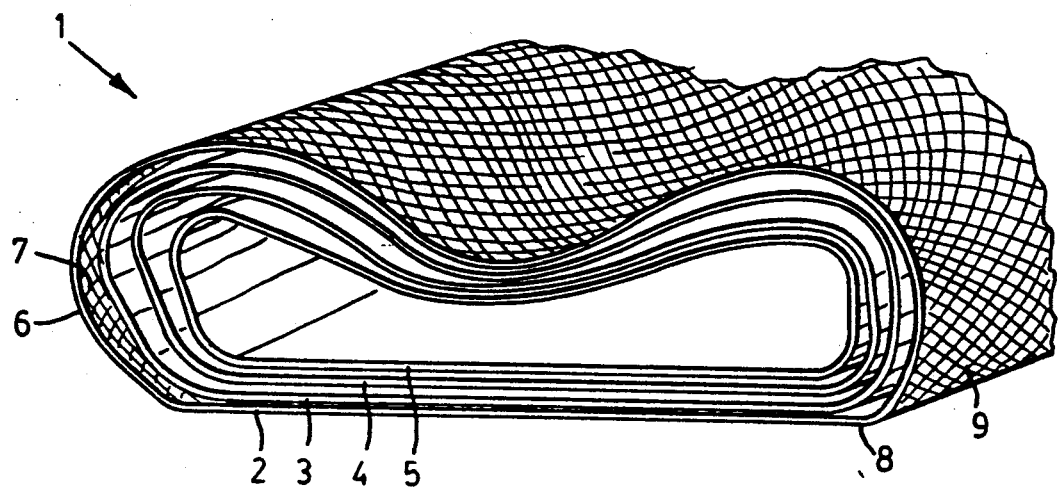
FIG. 1 is a schematic representation of a plurality of flexible concentric tubes.

FIG. 1 shows a plurality of flexible concentric tubes, generally shown by 1, that are formed from a thermoplastic polymer. The plurality of tubes 1 is formed from individual tubes, indicated by 2, 3, 4 and 5; it is to be understood that the number of tubes may be varied over a wide range. Outer tube 2 is shown to have an outer coating 6 of an adhesive and an inner coating 7 of an adhesive, the adhesives being the same or different. Similarly, at least one surface of each of films 3, 4 and 5 normally would be coated with an adhesive, such that at least one surface of each pair of surfaces of the tubes in contact or in a face-to-face relationship would be coated with an adhesive. It is to be understood that the inner surface of tube 5 i.e. the surface that would be the inside of the lining subsequently formed in the metallic pipe normally would not be coated with an adhesive. A flexible tear resistant material in the form of fabric 8 is shown as enveloping the plurality of concentric tubes generally indicated by 1. In the embodiment shown, fabric 8 is shown to have a warp and weft structure indicated by 9.

Figure 2:
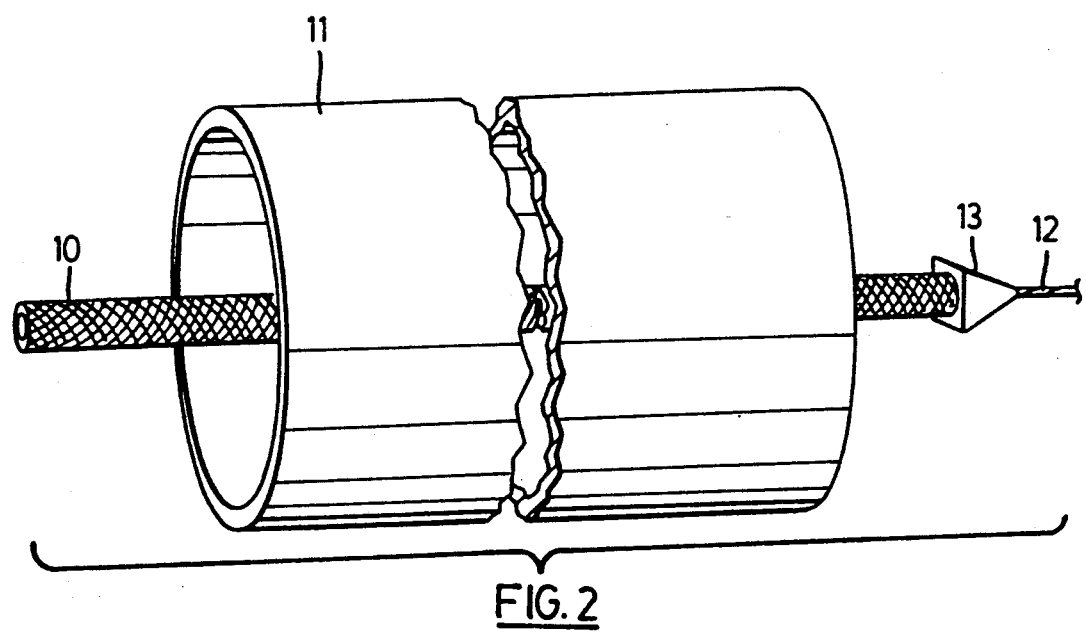
FIG. 2 is a schematic representation of a plurality of flexible concentric tubes of FIG. 1 being pulled through a section of metallic pipe.

FIG. 2 shows a plurality of concentric tubes wrapped with a flexible tear resistant material in the form of a fabric, generally indicated by 10, being pulled through a metallic pipe indicated by 11. The diameter of the metallic pipe 11 would normally be greater than the diameter of the collapsed enveloped plurality of tubes 10, although it may be only slightly so. The enveloped tubes 10 are being pulled by means of rope 12 which is connected to the enveloped tubes by means of clamp 13.

Figure 3:
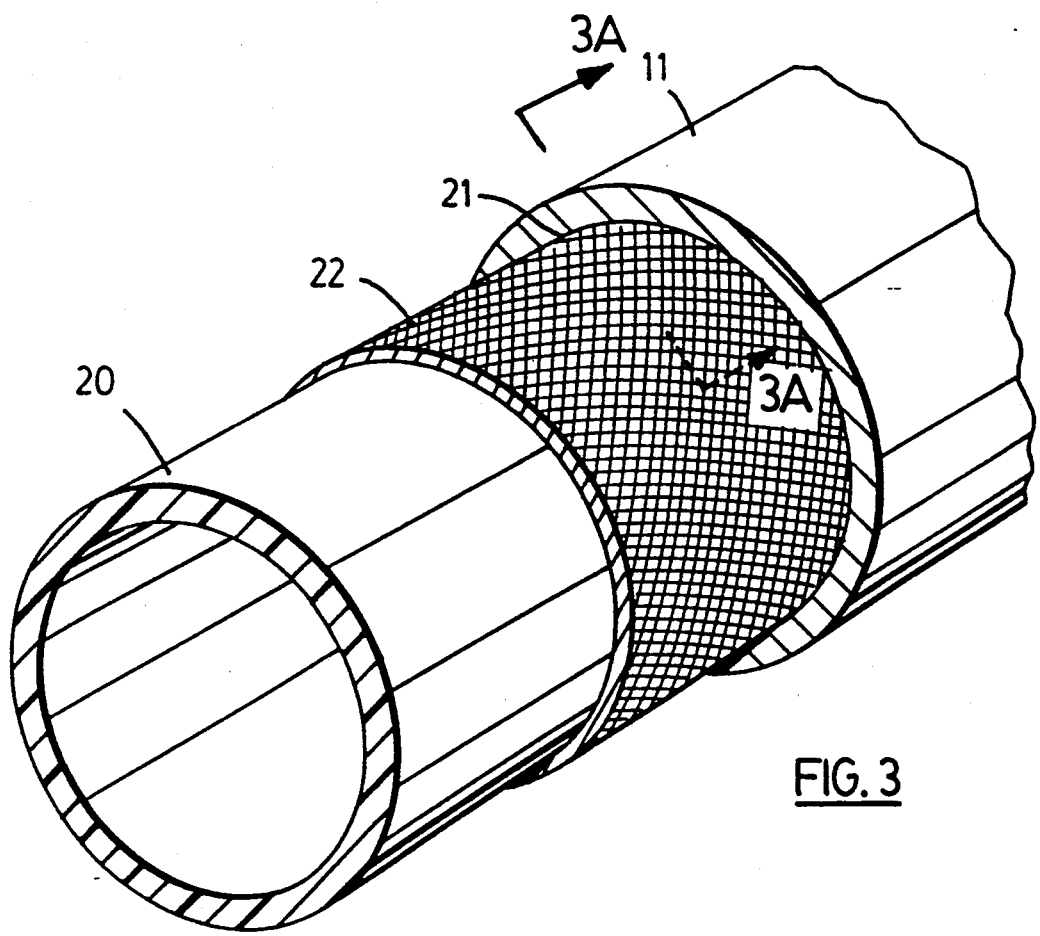
FIG. 3 is a schematic representation of a metallic pipe lined with the plurality of flexible tubes.
Figure 3A:
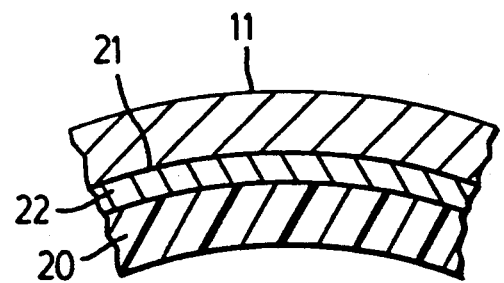
FIG. 3A is a cross-section of the lined metallic pipe through A—A of FIG. 3.

FIG. 3 shows metallic pipe 11 having an internal liner 20 formed from thermoplastic polymer. In preferred embodiments, liner 20 is bonded to the internal wall surface 21 of metallic tube 11. Liner 20 although formed from an enveloped plurality of concentric tubes is in the form of a single entity as a result of bonding of the layers together. The flexible tear resistant material used to envelope the concentric tubes i.e. fabric 22, is shown at the interface between liner 20 and surface 21 of metallic tube 11, as is more clearly shown in FIG. 3A.

In operation, a plurality of concentric tubes are formed. The tubes would normally be of identical or substantially identical diameter, such that when inflated the surface of any one tube would be in contact with the immediately adjacent surface of the juxtaposed tube. Each tube is preferably coated with an adhesive capable of effecting bonding between the tubes under the influence of heat and pressure. The individual tubes may be formed from the same polymer or formed from two or more different polymers. The use of different polymers would facilitate the incorporation of barrier or other properties in the liner that is to be formed within the metallic pipe. The plurality of tubes may be formed by pulling one tube through another tube in a sequence of steps, or substantially simultaneously, or by wrapping one tube around another tube using continuous strips of film of thermoplastic polymer. If the outer tube has not been coated on the outside with an adhesive, and if it is desired to do so, the adhesive may be applied prior to forming the plurality of concentric tubes or subsequent to the formation thereof.

A flexible tear resistant material, especially a woven fabric, is enveloped around the plurality of concentric tubes. This may be accomplished by forming a tube of the woven fabric and inserting the plurality of concentric tubes inside the woven fabric as a single step or as a series of steps. Alternatively, the woven fabric may be wrapped around the plurality of tubes simultaneously with the formation of the concentric tubes.

The enveloped plurality of concentric tubes are then pulled through a length of metallic pipe. The metallic pipe may be a substantially linear section of pipe, possibly of considerable length. Alternatively, the pipe may have one or more bends in it, including elbows, loops and the like, which are required in order to conform the pipeline to contours of the ground over which or through which it is travelling, to allow for expansion and contraction between different periods of the year and/or to allow for changes in temperature in the fluid being passed through the pipeline. After the tube has been pulled through the section of metallic pipe, the tube is then inflated with fluid. The fluid may be a gas e.g. air or steam, or it may be a liquid e.g. water. The preferred fluid is steam. In embodiments, the fluid is a heated fluid so that the expansion of the flexible tube and the heating of the tube to effect bonding of the layers of tube together are carried out simultaneously. If the tube is expanded using a cooled fluid, then in a subsequent step the tube would need to be heated in order to bond the layers together. The resultant lined metallic pipe has a liner that is essentially a single entity, not remaining a plurality of tubes, with the result that the liner will not collapse into the pipe when pressure is removed from the interior of the pipe even if the liner is not bonded to the internal wall of the pipe.

The pipe that may be lined using the method of the present invention is a metallic pipe, especially a steel pipe. In preferred embodiments, the pipe is formed from a carbon steel or other steel used in the formation of pipelines, especially pipelines used for the transportation of petroleum products.

The concentric tubes are formed from thermoplastic polymer, especially a thermoplastic polymer that is corrosion resistant with respect to the intended end use of the lined pipe. In preferred embodiments, the tubes are formed from polyethylene, especially a copolymer of ethylene and a $C_4$–$C_{10}$ higher alpha-olefin. The thermoplastic polymer may also be a polyamide, examples of which are nylon 11, nylon 12 and nylon 12/12. In embodiments, especially for pipelines used in the transportation of crude oil, the preferred polymer is nylon 12/12.

A variety of adhesives may be used, the requirements being that the adhesive may be coated onto the tubes prior to formation of the concentric tubes without bonding those tubes together so as to lose flexibility of the tubes prior to insertion of the concentric tubes into the metallic pipe, and that the adhesive may be subsequently activated to effect bonding together of the concentric tubes e.g. under the influence of heat and pressure. In preferred embodiments, the adhesive is a grafted polyolefin, examples of which include polyolefins grafted with polar monomers.

The polyolefin that is grafted may be a homopolymer of a $C_2$–$C_8$ hydrocarbon alpha-olefin or a copolymer of such an alpha-olefin with a $C_3$–$C_8$ hydrocarbon alpha-olefin Examples of such polymers are homopolymers of ethylene and propylene and copolymers of ethylene with propylene, butene-1, hexene-1 and octene-1. Alternatively, the polymer may be a copolymer of ethylene and a vinyl alkanoate, especially ethylene/vinyl acetate copolymers, or a copolymer of ethylene and a (meth)acrylate ester, examples of which are ethylene/ethyl acrylate copolymers, ethylene/methyl acrylate copolymers, ethylene/butyl acrylate copolymers and ethylene/methyl methacrylate copolymers. Other copolymers include copolymers of ethylene with acrylic acid or methacrylic acid, and analogous ionomers viz. copolymers having the acid groups thereof partially neutralized by metals especially with sodium, zinc or aluminum. Additionally, the copolymer may be a copolymer of ethylene with carbon monoxide, optionally also with one of the aforementioned monomers, examples of which are ethylene/carbon monoxide, ethylene/butyl acrylate/carbon monoxide, and ethylene/vinyl acetate/carbon monoxide copolymers. Such copolymers are known in the art and many examples thereof are available commercially.

The polymers are available in a variety of molecular weights, which is usually expressed in terms of melt index. Melt index is measured by the procedure of ASTM D-1238 (condition E). Polymers with a wide range of melt indices may be used.

The grafting monomer is selected from the group consisting of ethylenically unsaturated carboxylic acids and ethylenically unsaturated carboxylic acid anhydrides, including derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride or citraconic anhydride, nadic anhydride, nadic methyl anhydride and tetrahydro phthalic anhydride. Examples of derivatives of the unsaturated acids are salts, amides, imides and esters e.g.

mono- and disodium maleate, acrylamide, maleimide, glycidyl methacrylate and diethyl fumarate.

The amount of monomer will depend in particular on the reactivity of the monomer and the level of grafting that is to be achieved. For example, if the monomer is maleic anhydride, the amount of monomer may be as high as about 5%, especially 0.1-3%, by weight of the copolymer, and particularly in the range of 0.2-2% by weight. With other monomers, different amounts of monomer may be preferred.

Grafted polymers of the type described above are available commercially e.g. from Du Pont Canada Inc.

The use of grafted polyolefins with tubes formed from polyamides has the advantage of providing barrier properties to hydrocarbons through the use of the polyamide and to polar materials e.g. water and methanol, through the use of the grafted polyolefin. Such a combination of tubes and adhesive may afford increased protection against corrosive substances. The use of adhesives permits the bonding of adjacent tubes to be achieved without the need to heat the liner to a temperature above the softening point of the polymer. Use of an appropriate adhesive permits the bonding to be achieved over a range of temperatures to reflect process requirements and the heating means that may be available at any particular installation site.

In the method of the present invention, the plurality of concentric flexible tubes of thermoplastic polymer is enveloped in a layer of flexible, expansible tear resistant material. A variety of such tear resistant materials may be used. For example, the material may be a woven structure formed from a thermoplastic polymer e.g. a fabric formed from fibres or the like of a thermoplastic polymer using a weaving, knitting or other process to form the fabric. Alternatively the material may be formed from a wire mesh. Any such mesh would need to be sufficiently flexible and expansible to permit the enveloped concentric tubes to be inserted into a pipeline and subsequently inflated. In another embodiment, the flexible material is formed from woven tapes of thermoplastic polymer.

The thermoplastic polymer used to form fabric or woven tapes may be selected from a wide variety of polymers, including polyolefins, polyesters and polyamides. In preferred embodiments, the polymer is a polyethylene, especially a copolymer of ethylene and a $C_4$–$C_{10}$ higher alpha-olefin. The thermoplastic polymer may also be a polyamide, examples of which are nylon 11, nylon 12 and nylon 12/12.

As noted in the copending patent application of DC-0245, the concentric tubes may have random, spaced apart perforations, to enable fluid trapped between the layers to escape during expansion of the concentric tubes to form the liner. It may also be advantageous to have the flexible, tear resistant fabric used in the method of the present invention in a form that permits fluid to escape along the outside of the liner to a vent suitably located in the pipeline. For this reason, materials with a relatively coarse weave or wire mesh may offer advantages in the operation of the process of the invention.

A plurality of tubes is used in the process of the present invention, depending in particular on the required thickness of the liner, practical considerations e.g. the formation of the concentric tubes from individual tubes and the required flexibility of the concentric tubes especially during insertion into the metallic pipe, and the particular construction of the resultant plurality of tubes. The thickness of the individual tubes may be varied over a wide range e.g. 40 to 800 microns, preferably 75 to 250 microns. The total thickness of the liner may vary over a range of 0.1 to 2.5 cm, and prefeably 0.25 to 1.0 cm. The number of tubes used is varied in accordance with film and liner thickness, but in preferred embodiments is in the range of 5 to 50 and especially 10 to 25.

The method of the present invention may be used for the lining of metallic pipes, especially such pipes in the form of a pipeline. In particular, the method may be used for the lining of pipelines in situ, without the need to eliminate bends, loops or the like from the section of the pipeline that is to be lined. The method may be used to permit liners to be pulled through long lengths of straight metallic pipe as well as through elbows, bends and the like with reduced risk of tearing of the fabric of the liner. The liner formed from the flexible tubes may then be converted into a rigid liner by the application of heat and pressure.

I claim:

1. A method of lining a metallic pipe consisting essentially of:
   (a) forming a plurality of at least five concentric flexible tubes of thermoplastic polymer enveloped with a layer of a flexible, expansive, tear resistant material, said tubes being capable of being bonded together under the influence of heat and pressure;
   (b) inserting the enveloped plurality of concentric tubes into a section of metallic pipe by pulling the enveloped tubes into the metallic pipe;
   (c) inflating the tubes using a fluid under pressure; and
   (d) heating the tubes within the pipe to cause the tubes to be bonded together to form a single tube lining said metallic pipe, each tube of the plurality of tubes having a thickness of about from 40 to 800 microns, and the thickness and number of tubes being selected to provide said single bonded tube with a total thickness of about from 0.1 to 2.5 cm.

2. The method of claim in which the concentric tubes are coated with an adhesive that is activated under the influence of heat.

3. The method of claim 2 in which the tear resistant material is a woven thermoplastic polymer structure.

4. The method of claim 2 in which the tear resistant material is a woven fabric formed from tapes of a thermoplastic polymer.

5. The method of claim 4 in which the tear resistant material is a polyolefin.

6. The method of claim 2 in which the tear resistant material is a fabric formed from fibres of a thermoplastic polymer.

7. The method of claim 6 in which the tear resistant material is a polyolefin or a polyamide.

* * * * *